United States Patent [19]
Sullivan, III

[11] Patent Number: 6,012,694
[45] Date of Patent: Jan. 11, 2000

[54] MONITOR SUSPENSION SYSTEM

[75] Inventor: Thomas J. Sullivan, III, Swarthmore, Pa.

[73] Assignee: Sullivan Construction Company, Holmes, Pa.

[21] Appl. No.: 09/013,854

[22] Filed: Jan. 27, 1998

[51] Int. Cl.[7] .................................................. A47H 1/10
[52] U.S. Cl. ...................... 248/323; 248/917; 248/919; 312/223.2
[58] Field of Search ................................ 248/318, 918, 248/919, 920, 921, 922, 923, 924, 324, 917, 323; 312/223.2

[56] References Cited

U.S. PATENT DOCUMENTS

| | | |
|---|---|---|
| Re. 34,266 | 6/1993 | Shairbaum . |
| 4,520,979 | 6/1985 | McInnis .................................. 248/323 |
| 4,562,482 | 12/1985 | Brown . |
| 4,590,866 | 5/1986 | Shairbaum . |
| 4,669,789 | 6/1987 | Pemberton . |
| 4,755,009 | 7/1988 | Price et al. . |
| 4,836,478 | 6/1989 | Sweere . |
| 5,071,204 | 12/1991 | Price et al. . |
| 5,118,172 | 6/1992 | Ugalde . |
| 5,125,727 | 6/1992 | Lechman et al. . |
| 5,139,223 | 8/1992 | Sedighzadeh ........................... 248/921 |
| 5,179,367 | 1/1993 | Shimizu . |
| 5,205,631 | 4/1993 | Wegman et al. . |
| 5,310,152 | 5/1994 | O'Neil ................................... 248/324 |
| 5,368,377 | 11/1994 | Baines . |
| 5,377,951 | 1/1995 | Johnson et al. . |
| 5,393,025 | 2/1995 | Franklin ............................ 248/917 X |
| 5,400,993 | 3/1995 | Hamilton ........................... 248/919 X |
| 5,410,972 | 5/1995 | Schairbaum . |
| 5,480,224 | 1/1996 | Ugalde . |
| 5,501,420 | 3/1996 | Watt et al. ............................. 248/919 |
| 5,544,594 | 8/1996 | Schairbaum . |
| 5,572,935 | 11/1996 | Shairbaum . |
| 5,626,323 | 5/1997 | Lechman et al. . |
| 5,655,822 | 8/1997 | Roberts et al. . |
| 5,655,823 | 8/1997 | Schairbaum ........................... 248/920 |
| 5,662,395 | 9/1997 | Lechman . |
| 5,694,861 | 12/1997 | Laukamm-Josten ..................... 248/923 |
| 5,758,935 | 6/1998 | Coonan ................................ 312/223.3 |
| 5,823,642 | 10/1998 | Korolainen ....................... 312/223.3 X |

FOREIGN PATENT DOCUMENTS

| | | |
|---|---|---|
| 1106895 | 11/1981 | Canada . |
| 2650740 | 2/1991 | France . |
| 34 27 229 A1 | 7/1984 | Germany . |
| 35 16 855 A1 | 5/1985 | Germany . |
| 42 39 045 A1 | 11/1992 | Germany . |
| 43 01 154 A1 | 1/1993 | Germany . |
| 296 19 057 U1 | 11/1996 | Germany . |
| 197 00 657 A1 | 1/1997 | Germany . |
| 41 00 675 A1 | 1/1997 | Germany . |
| 297 08 485 U1 | 5/1997 | Germany . |
| 297 10 962 U1 | 6/1997 | Germany . |
| 197 00 657 A1 | 11/1997 | Germany . |
| 9-149822 | 10/1997 | Japan . |
| WO 85/03626 | 8/1985 | WIPO . |
| WO 93/25117 | 5/1993 | WIPO . |
| WO 96/11600 | 10/1995 | WIPO . |
| WO 95/30355 | 11/1995 | WIPO . |

OTHER PUBLICATIONS

Kathryn Jones, "High Tech Comes to Desk", Dallas Times Herald, Ed Schairbaum (inventor).

Engineered Data Products Brochure.

Jeff Guinn, FW Man Markets 'Electronic Desk (Feb. 2, 1985), Star Telegram Writer, Ed Schairbaum (inventor), 2 pages.

Electronic Desk Brochure by Engineered Data Products.

*Primary Examiner*—Derek J. Berger
*Attorney, Agent, or Firm*—Morgan, Lewis & Bockius LLP

[57] ABSTRACT

A monitor suspension method and apparatus for adjustably suspending a monitor to a work surface so that the distance and angle between the monitor and the work surface can be adjusted by a user.

19 Claims, 9 Drawing Sheets

MONITOR SUSPENSION SYSTEM

BACKGROUND OF THE INVENTION

1. Field of the Invention

The present invention relates to methods and apparatuses for adjustably suspending a computer monitor or other video monitor under a work surface.

2. Description of the Related Art

Computer monitors and other video display monitors (hereinafter "monitors") are an increasingly ubiquitous part of the work place. Such monitors are typically mounted on a user's desk or work surface. This arrangement, however, not only wastes precious work space, but also suffers from a variety of ergonomic disadvantages. For example, many users find that it is uncomfortable to view a monitor in an upright vertical position on their desk for extended periods. Also, it is awkward for a user to attempt to simultaneously view both the monitor and papers or other materials arrayed on the work surface if the monitor is placed in the standard vertical arrangement on top of the work surface.

Methods and apparatuses for positioning a monitor underneath a work surface (which may then be viewed by a user, for example, through a piece of non-reflective glass placed over a hole in the work surface) are known. However, such known methods and apparatuses tend to be both bulky and relatively inflexible. In particular, such systems tend to take up an inordinate amount of space underneath the work surface. Also, once a monitor is placed in such known systems, it is difficult to adjust the positioning of the monitor to accommodate the changing preferences of one or more users. Also, known systems may not be able to accommodate diverse sizes and shapes of monitors.

SUMMARY OF THE INVENTION

The present invention provides an improved video monitor suspension system.

In accordance with one important aspect of the invention, a monitor suspension system is provided which is adapted to cradle a monitor and pivotally couple the monitor to structure which includes a work surface. The system is adjustable in such a way that the distance and angle between the monitor and a work surface can be adjusted.

In accordance with another important aspect of the invention, a monitor suspension system is provided which is characterized by a pivot hinge adapted to pivotally couple a monitor to a work surface and at least one monitor support strap engageable with a distal end of the monitor and wherein opposite ends of the support strap are adapted to be connected to a work surface in such a way that the length of the support strap is adjustable to suspend the monitor at a desired angle to the work surface.

Still further, the present invention provides an improved monitor suspension system and method for suspending a monitor, the method including the steps of cradling a monitor in an adjustable suspension system, pivotally coupling the monitor suspension system to a work surface and adjusting the suspension system so that the monitor is viewable at a desired angle with respect to the work surface.

Those skilled in the art will recognize that the present invention offers numerous advantages over prior art monitor suspension devices and systems. In particular, the present invention provides an unobtrusive, adjustable, relatively inexpensive system and method for suspending a monitor under a work surface.

DESCRIPTION OF THE PREFERRED EMBODIMENTS

Figure 1:
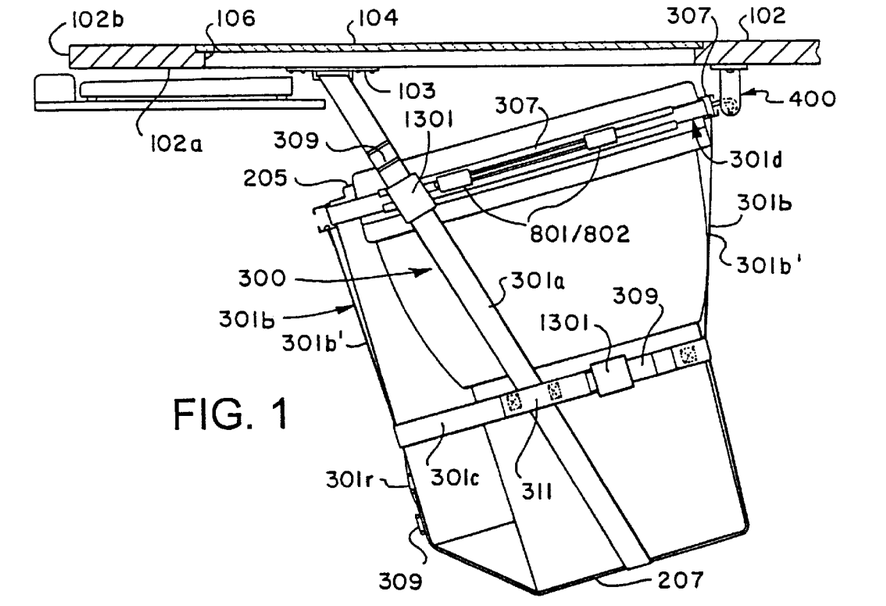
FIG. 1 shows a side view of a monitor suspension system in accordance with a preferred embodiment of the present invention.
Figure 2:
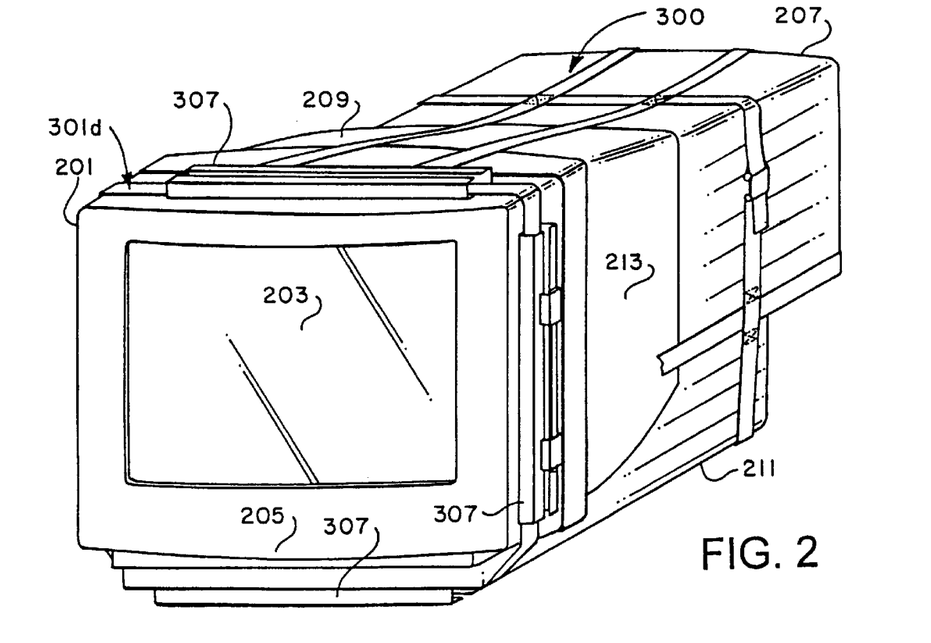
FIG. 2 shows a three dimensional view of a strap assembly in accordance with a preferred embodiment of the present invention installed on a typical monitor.

The present invention is directed to improved methods and apparatuses for suspending monitors from work surfaces. As a result, reference is made throughout to monitors and various parts of monitors in connection with a complete description of the invention. In particular, as shown in FIGS. 1 and 2, reference is made herein to the following parts of a typical monitor 201: screen 203, proximal end 205, distal end 207, top 209, bottom 211, and sides 213. A monitor is not, however, part of the invention.

A monitor suspension system in accordance with the present invention comprises means for cradling a monitor and means for coupling a monitor to a work surface 102.

Figure 15A:
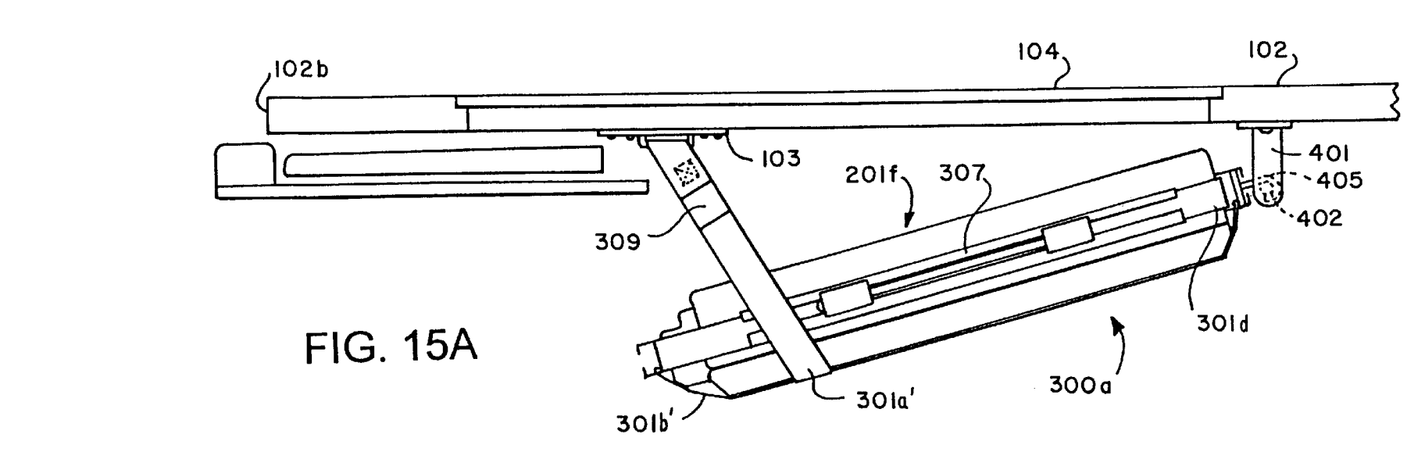
FIGS. 15A and 15B show side views of a monitor suspension system in accordance with two preferred embodiments of the present invention.
Figure 15B:
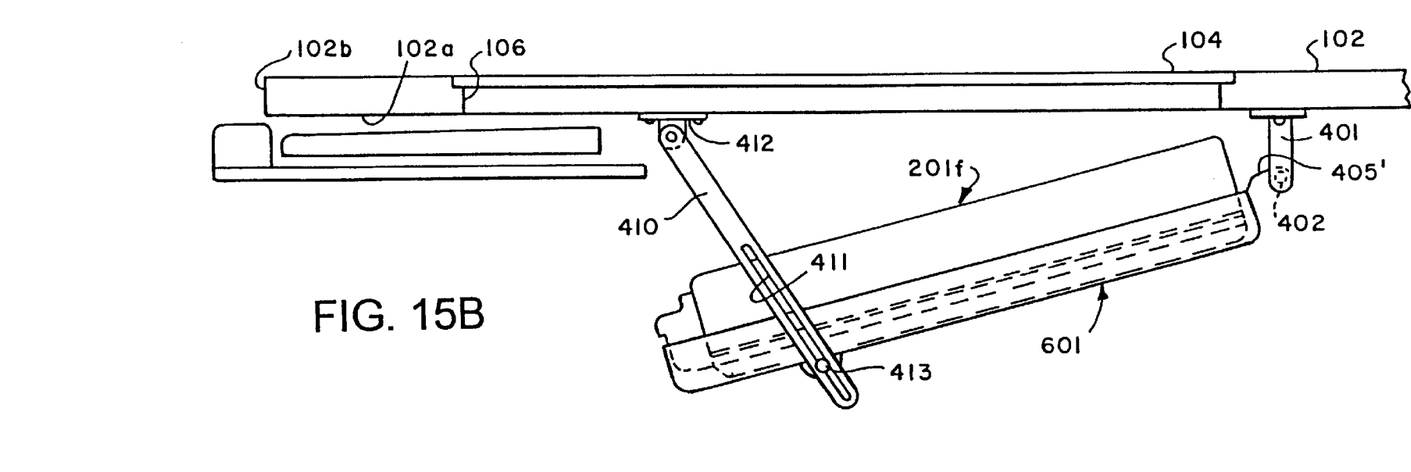

The monitor cradling means comprises straps or other adjustable elements sufficient to support the weight of a monitor. As shown in FIGS. 1, 15A and 15B, the monitor cradling means is adapted to receive and securely hold a wide variety of monitor sizes and shapes. For example, FIG. 1 shows the monitor cradling means supporting a large CRT monitor, whereas FIGS. 15A and 15B show monitor cradling means supporting a flat panel LCD monitor. Finally, the monitor cradling means is adapted to be removably and pivotally coupled to the underside of a work surface.

Figure 3:
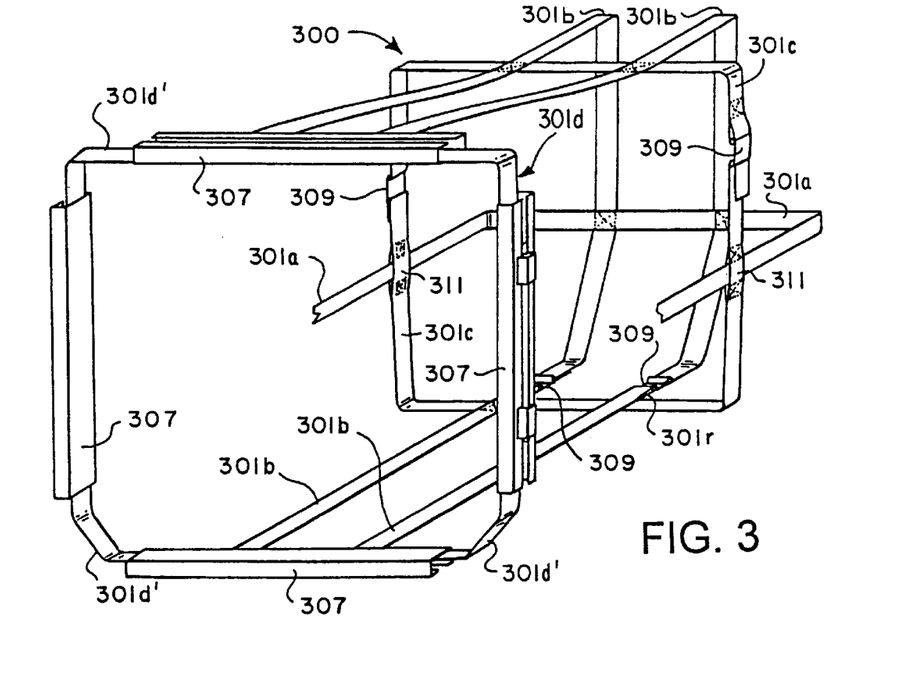
FIG. 3 shows a three dimensional view of a strap assembly in accordance with a preferred embodiment of the present invention.
Figure 13A:
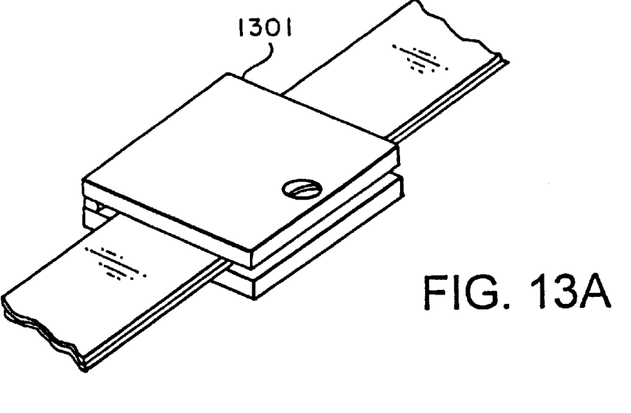
FIGS. 13A, 13B and 13C show three dimensional, side and top views, respectively, of a safety clamp portion of a monitor suspension system in accordance with a preferred embodiment of the present invention.
Figure 13B:
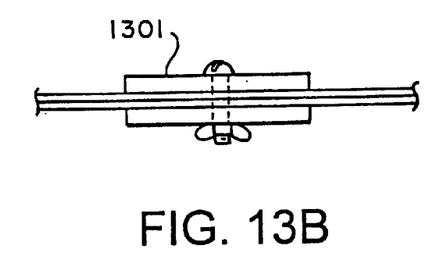
Figure 13C:
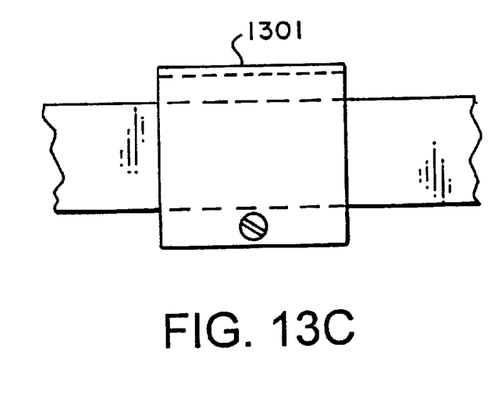

In a preferred embodiment, as shown in FIGS. 1 and 3, the monitor cradling means comprises a plurality of monitor support straps 301a, 301b and 301c adapted to securely engage a monitor 201. The monitor cradling means preferably comprises at least one lateral monitor support strap 301a, at least two vertical monitor support straps 301b, one circumferential monitor support strap 301c and a monitor gripping strap 301d. The support straps 301 may be made from any of the materials, preferably synthetic, typically used for cordage (round or flat) so long as it has sufficient strength and durability to support the weight of a monitor for extended periods. Suitable materials include, without limitation, nylon, mylar, rayon, glass rope and the like. All of the straps preferably have safety clamps 1301 (as shown in FIGS. 1 and 13) or other devices to secure strap ends and prevent an accidental strap release.

Figure 11:
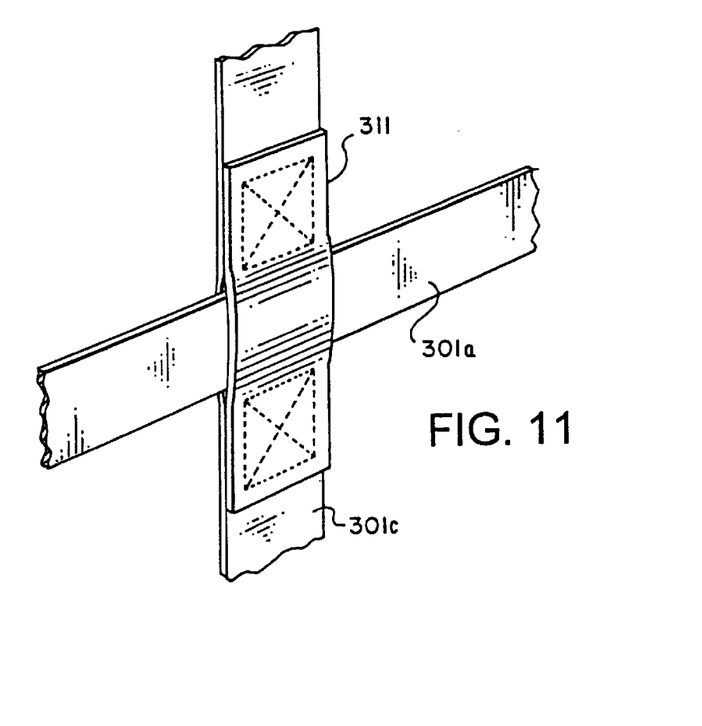
FIG. 11 shows a detail three dimensional view of a slip joint of a monitor suspension system in accordance with a preferred embodiment of the present invention.
Figures 12A, 12B:
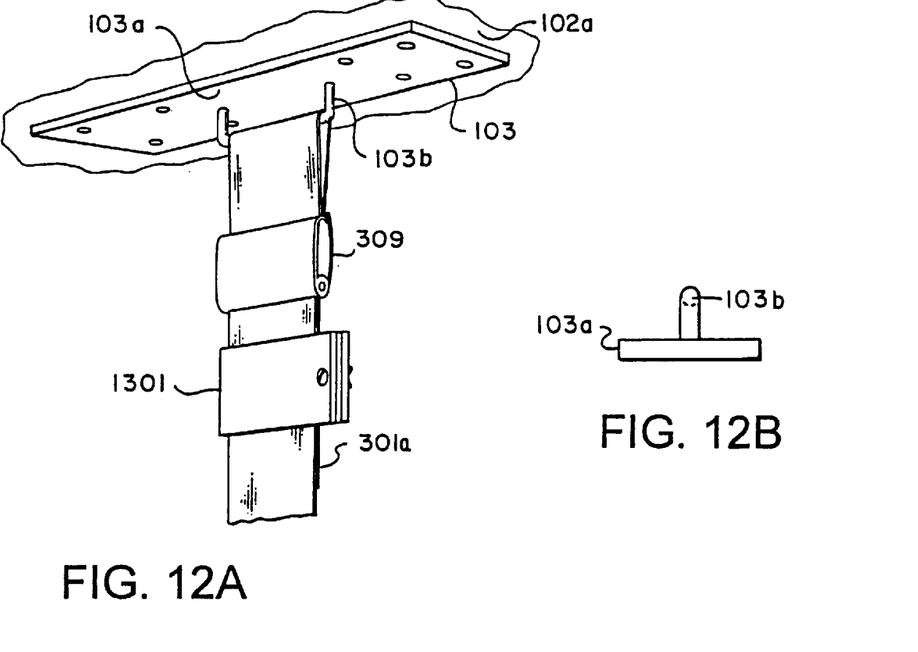
FIGS. 12A, 12B, 12C and 12D show three dimensional, bottom, side and end views, respectively, of a front support assembly portion of a monitor suspension system in accordance with a preferred embodiment of the present invention.
Figure 12C:
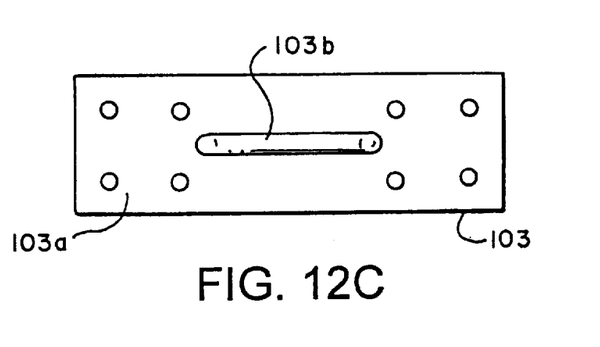
Figure 12D:
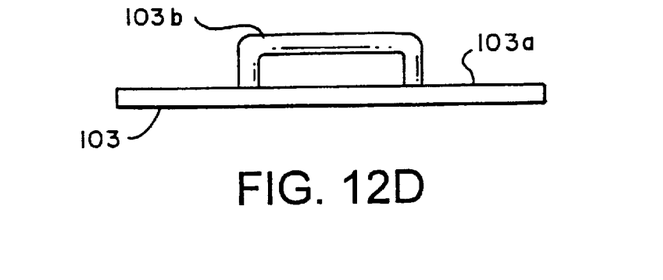

The lateral monitor support strap 301a is adapted to be removably coupled to a front support assembly 103, as shown in FIGS. 1 and 12. The front support assembly 103 is adapted to be mounted on the underside of a work surface 102 or (as shown in FIG. 1) to the sides of the vertical support members of a work surface 102. Work surface 102 includes an opening covered by a member 104 through which a monitor, supported by the monitor cradling means as shown, may be viewed. The lateral monitor support strap 301a has an adjustable buckle and/or clamp assembly 309 on one or both ends to enable a user to adjust the length of the lateral monitor strap 301a. The center of the lateral monitor support strap 301a engages the distal end of a monitor. The lateral monitor support strap 301a passes through slip joints 311 in the circumferential monitor support strap 301c (as shown in FIGS. 1 and 11), which serve to secure the lateral support strap 301a in place and prevent slippage of the monitor.

Figure 4:
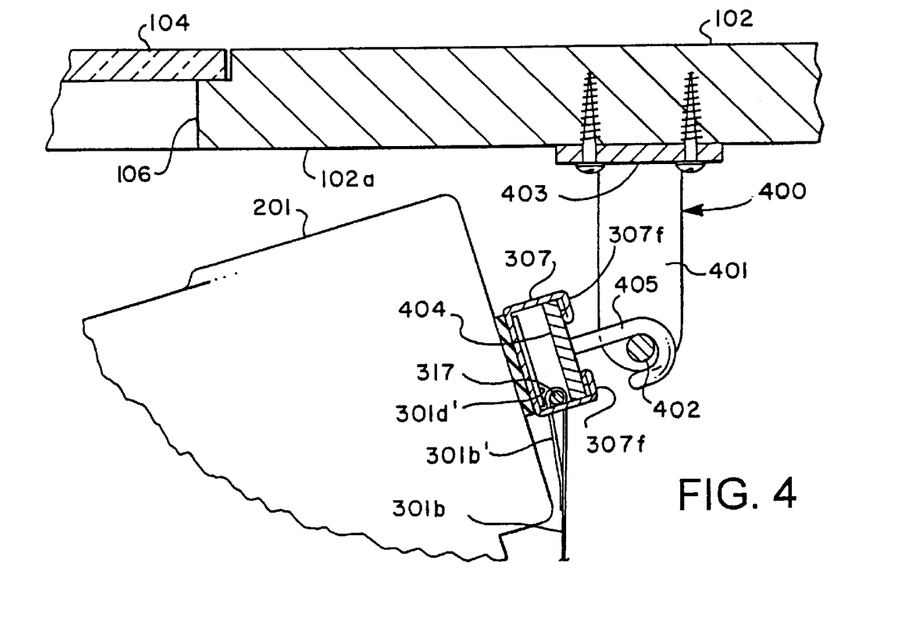
FIG. 4 shows a detailed side view of a pivot assembly portion of a monitor suspension system in accordance with a preferred embodiment of the present invention.
Figures 5A, 5B, 6A:
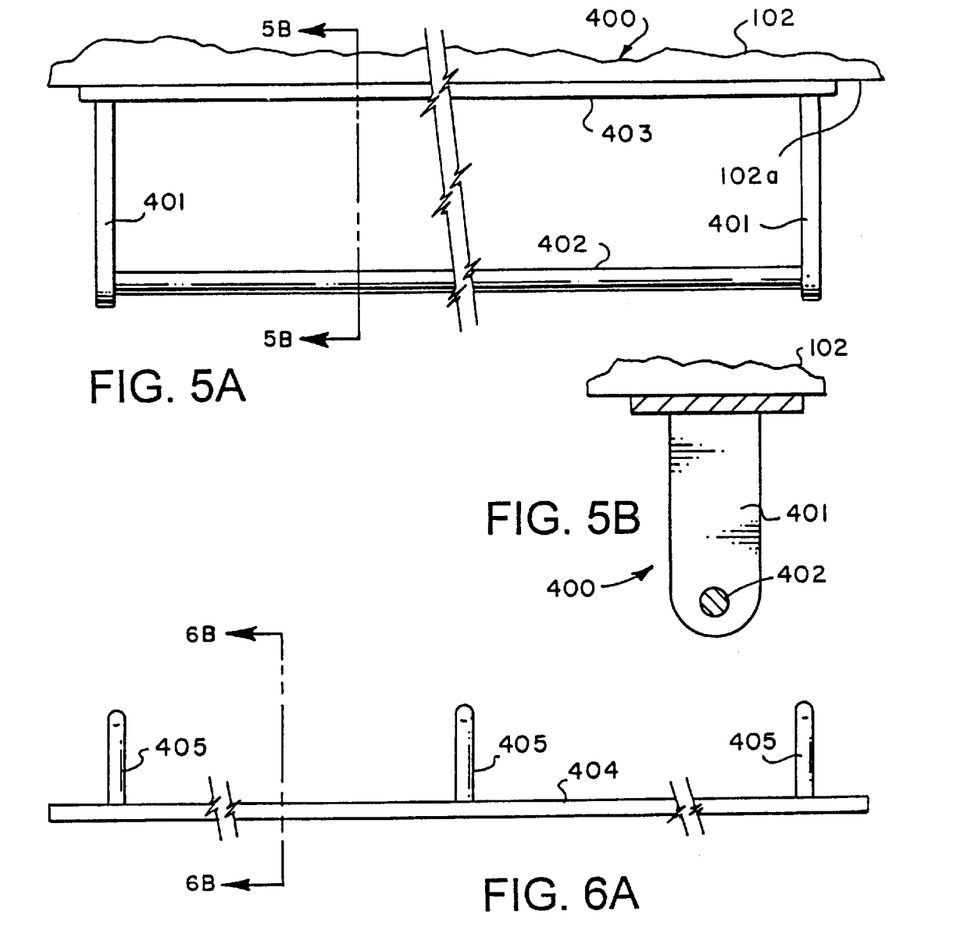
FIG. 5A shows a front view of a fixed member of the pivot assembly of FIG. 4.
FIG. 5B shows a side cross-sectional view of a fixed member of the pivot assembly of FIG. 4.
FIG. 6A shows a front view of a pivot hook portion of the pivot assembly of FIG. 4.
Figure 6B:
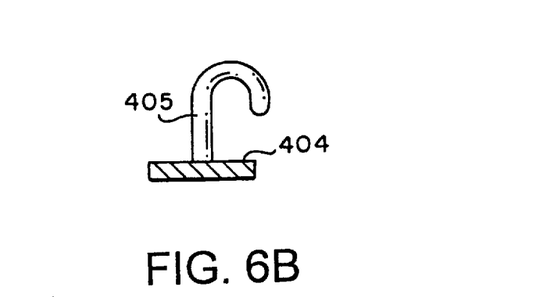
FIG. 6B shows a cross-sectional side view of a pivot hook portion of the pivot assembly of FIG. 4.
Figures 7A, 7B:
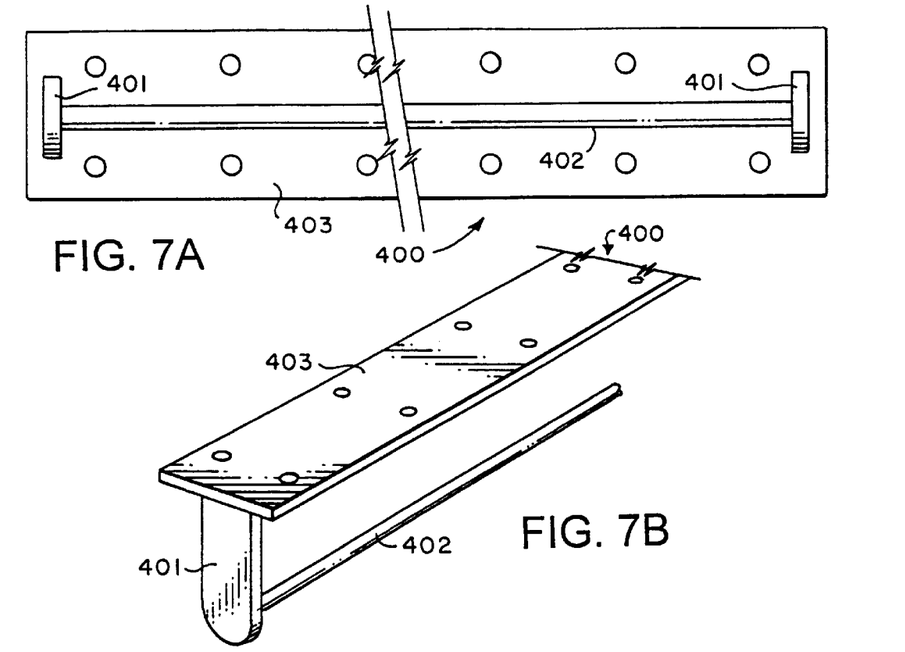
FIG. 7A shows a bottom view of a mounting plate of the pivot assembly of FIG. 4.
FIG. 7B shows a three dimensional view of a fixed member of the pivot assembly of FIG. 4.
Figure 14:
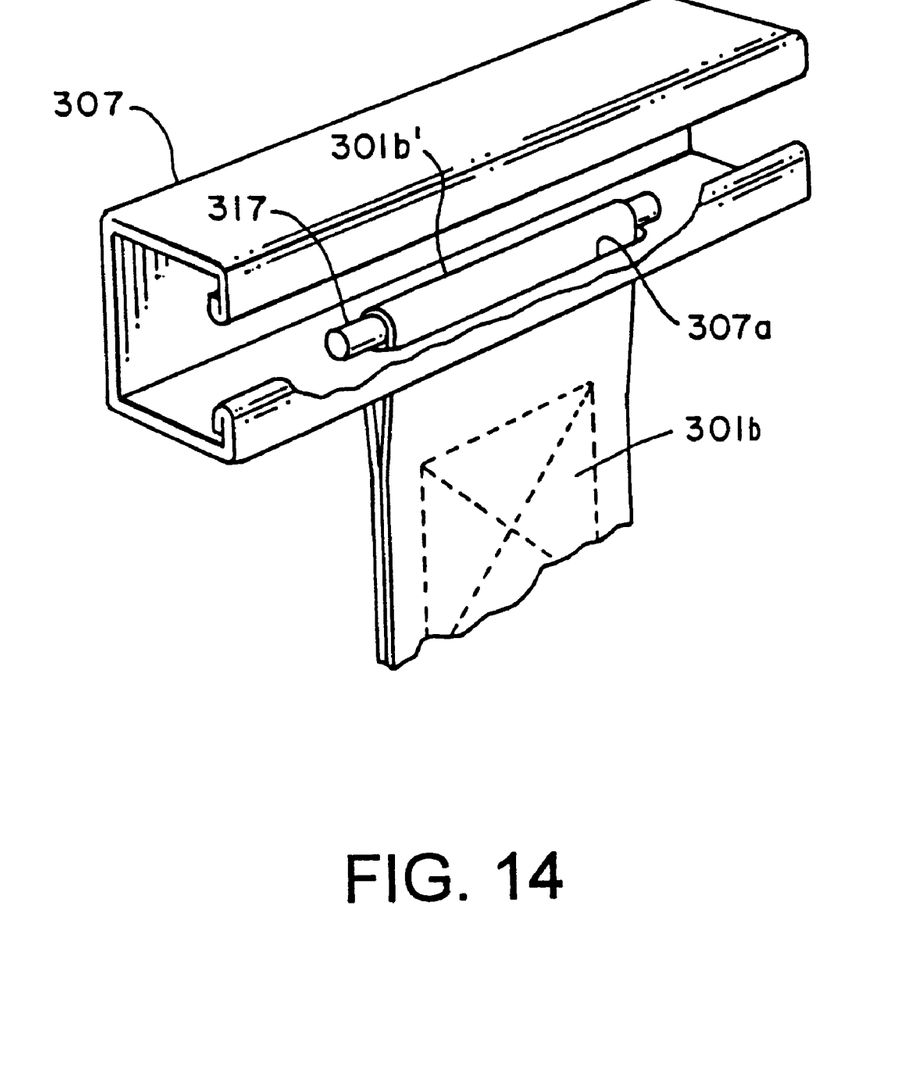
FIG. 14 shows a detailed cut-away view of a portion of the channel bracket shown in FIG. 4.

The vertical monitor support straps 301b are adapted to wrap around the distal end of a monitor perpendicular to the lateral monitor support strap 301a. The ends of the vertical monitor support straps 301b are coupled to the monitor gripping strap 301d. Preferably, the ends of the vertical support straps 301b are coupled to the channel brackets 307 which are secured to the monitor gripping strap 301d. The vertical monitor support straps 301b have adjustment buckles 309 or other suitable strap length adjustment devices to enable a user to adjust the length of the straps 301b to accommodate different sizes of monitors. The vertical monitor support straps 301b may be stitched or otherwise coupled to the lateral monitor support strap 301a at the points where the straps intersect. As shown in FIGS. 4 and 14, loops formed at the ends of the vertical support straps 301b are passed through notches in the sides of the channel bracket 307 and secured with a hitch pin 317 that is preferably at least 1 inch longer than the notch in the channel bracket 307.

The circumferential monitor support strap 301c is oriented perpendicular to the lateral and vertical monitor straps 301a and 301b and, when the monitor is in place, parallel to the plane of the monitor screen. The circumferential monitor support strap 301c is positioned and adapted to engage a monitor near the distal end, preferably at a point about one-third of the distance between the distal and proximal ends of the monitor. The circumferential monitor support strap 301c may be stitched or otherwise coupled to the vertical monitor support straps 301b at the points where the straps intersect. The circumferential monitor support strap 301c has an adjustment buckle 309 or other suitable strap length adjustment device to enable a user to adjust the length of the straps 301c to accommodate different sizes of monitors.

Figure 8:
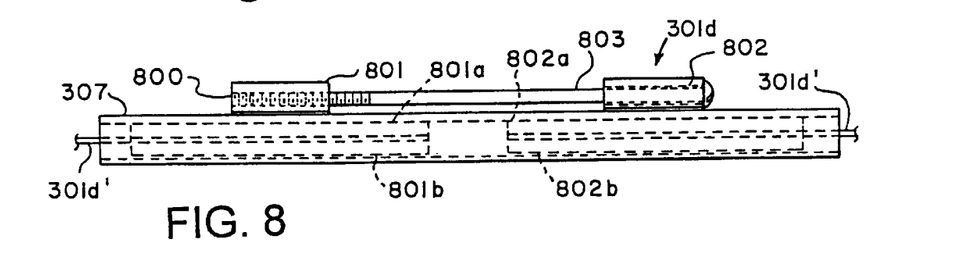
FIG. 8 shows a channel bracket with a tightening screw clamp assembly of a monitor suspension system in accordance with a preferred embodiment of the present invention.
Figure 9:
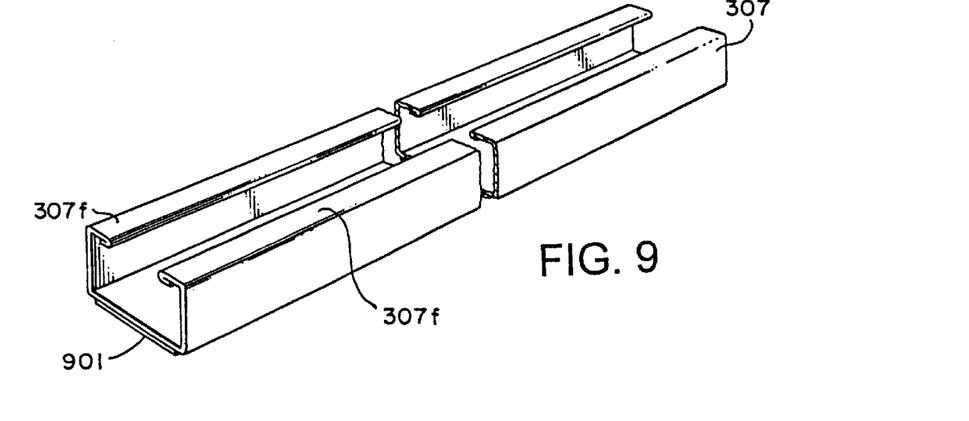
FIG. 9 shows a three dimensional view of a channel bracket portion of a monitor suspension system in accordance with a preferred embodiment of the present invention.
Figure 10A:
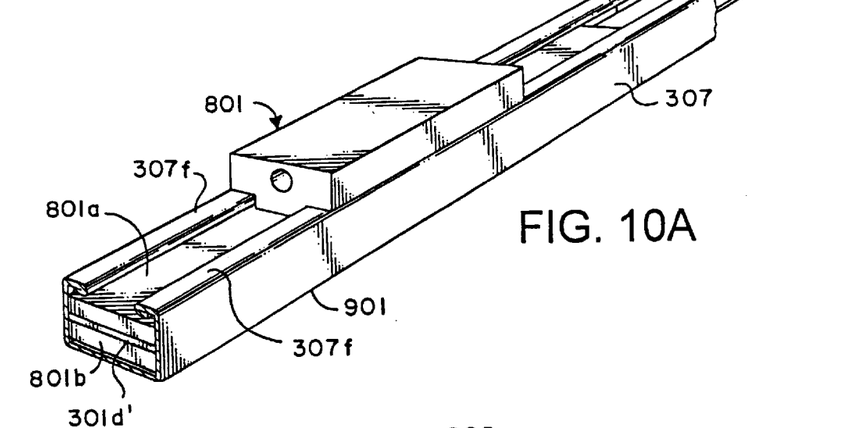
FIGS. 10A and 10B show three dimensional and side views, respectively, of a portion of the channel bracket of FIG. 8.
Figure 10B:
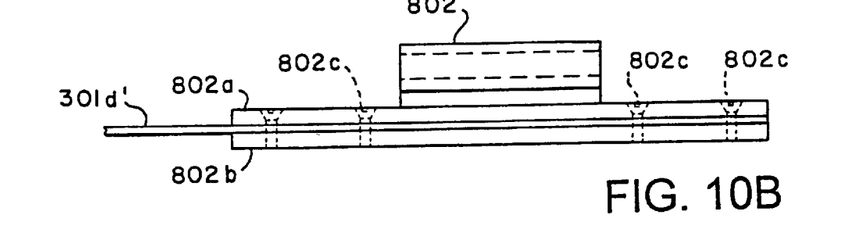

The monitor gripping strap 301d is oriented perpendicular to the lateral and vertical monitor straps 301a and 301b and, when the monitor is in place, parallel to the plane of the monitor screen. The monitor gripping strap 301d is positioned and adapted to engage the proximal end of a monitor. The monitor gripping strap 301d has means for securely engaging the proximal end of a monitor. In a preferred embodiment, as shown in FIG. 3, a plurality of channel brackets 307 are secured to the gripping strap 301d. The channel brackets preferably have a non-slip backing 901 (as shown in FIG. 9) which engages the proximal end of a monitor when the monitor gripping strap 301d is tightened. The non-slip backing 901 may comprise hook and loop fasteners, rubberized backing, or the like. One or more of the channel brackets 307 may include a tensioning screw clamp assembly 800 (as shown in FIG. 8). As shown in FIGS. 8 and 10, the tensioning screw clamp assembly 800 comprises a channel bracket 307 with two sliding members 801 and 802 each connected to an end of strap 301d and a tightening screw 803. The tightening screw 803 couples the channel bracket members and may be used to increase or decrease the distance between the bracket members thereby adjusting the tension on the gripping strap 301d. The gripping strap 301d is preferably coupled to the two members 801 and 802 of the screw clamp assembly 800 by the compression of upper and lower plates of the bracket members 801 and 802. Thus, the screw clamp assembly 800 may be used to tighten the monitor gripping strap 301d to a point where the strap securely engages the proximal end of a monitor.

When installed, the monitor cradling means is pivotally coupled to the underside of a work surface. Any hinge like assembly may be used to pivotally couple the monitor cradling means to a work surface as long as the assembly is sufficient to support the weight of a monitor and permits the monitor cradling means to pivot relative to the work surface. In a preferred embodiment, as shown in FIGS. 4, 5, 6 and 7, means for pivotally coupling a monitor to a work surface comprises a pivot assembly comprising a fixed member 401 with a pivot rod 402 mounted on the underside of a work surface 102 and a pivot hook 403 mounted on the channel bracket 307. Alternatively, the pivot hook 403 may be mounted on the gripping strap 301d or the monitor itself. The pivot assembly removably and pivotally couples the monitor to the work surface.

A monitor suspension system in accordance with the present invention is preferably installed and operated as follows. The front support members 103 and the fixed member 401 of the pivot assembly are coupled to the underside of a work surface 102 or the side support members of a work surface 102. The monitor cradling means comprising the lateral, vertical and circumferential monitor support straps and the gripping strap are preferably preassembled with all of the straps 301 preferably adjusted to be slightly longer than their anticipated final arrangement. A monitor is then placed in the strap assembly with the distal end of the monitor towards the circumferential strap 301c and the proximal end of the monitor towards the monitor gripping strap 301d. The monitor gripping strap 301d is then tightened with the tightening screw 803 of the tightening screw clamp assembly 800. Once the gripping strap is secured, the vertical and circumferential support straps may be tightened. The entire strap assembly may then be coupled to the work surface 102 by engaging the pivot hook 403 to the pivot rod 402 secured to the fixed member 401 of the pivot hook assembly. The ends of the lateral strap member 301*a* may then be passed through the front support assembly 103 and the lateral support strap 301*a* may be shortened until the monitor is drawn up into the desired orientation beneath the work surface 102. The orientation of the monitor (i.e., the angle between the monitor and work surface) may be changed at any time by lengthening or shortening the lateral support strap 301*a*.

The present invention may be embodied in other different forms without departing from the spirit or essential attributes of the invention. For example, the monitor cradling assembly may consist of only a single lateral support strap in which case the pivot hook member may be coupled to the monitor with adhesives, screws, hook and loop fasteners or any other fastener capable of supporting the weight of the monitor. Alternatively the monitor cradling means may comprise more than one lateral support strap and/or any number of vertical support straps and or any number of circumferential support straps. The fixed member of the pivot assembly may be a bracket that may be suspended from an edge of the work surface as long as the bracket is sufficient to support the weight of a monitor. Alternative mechanisms may be suitable for tightening the gripping strap on the monitor such as any standard adjustable strap buckle so long as the gripping strap may be tightened sufficiently to hold the strap assembly in place when suspended from a work surface.

By way of further example, FIGS. 15A and 15B show how the present invention may be used with flat panel LCD monitors. As shown in FIG. 15A, the monitor cradling means may comprise a lateral monitor support strap 301*a*, a monitor gripping strap 301*d* engaging the side of the monitor, and one or more vertical monitor support straps 301*b* extending underneath the monitor from the gripping strap 301*d*. Alternatively, because of the small size and light weight of LCD monitors, the monitor cradling means may comprise a tray 601 (as shown in FIG. 15B) supporting the bottom of the monitor and extending at least partially around the sides of the monitor. The tray 601 may be made of any material so long as it has sufficient strength and durability to support the weight of the monitor for extended periods, and is preferably made from materials such as lightweight wood or synthetic components such as plastics, polyethylene, etc. The tray 601 may be pivotally coupled to a work surface with any hinge like assembly as long as the assembly is sufficient to support the weight of the monitor and permits the monitor cradling means to pivot relative to the work surface.

It will be understood by persons skilled in the art that various other changes in the details, materials, and arrangements of the parts which have been described and illustrated in order to explain the nature of this invention may be made by those skilled in the art without departing from the principle and scope of the invention expressed in the following claims.

What is claimed is:

1. A monitor suspension device comprising:
   (1) monitor cradling means for cradling a monitor comprising a plurality of straps arranged to securely hold said monitor, at least one of said straps is adapted to engage a back surface of said monitor at an opposite end of said monitor from a screen of said monitor, the ends of said at least one strap are adapted to be coupled to a work surface and the length of said at least one strap is adjustable for changing an angle of the screen relative to the work surface, and
   (2) means for pivotally coupling said monitor cradling means to said work surface comprising a hinge wherein a first member of said hinge is coupled to at least one of said straps and a second member of said hinge is adapted to be coupled to said work surface.

2. A monitor suspension device comprising:
   (1) a first monitor support strap adapted to engage a back surface of a monitor at an opposite end of said monitor from a screen of said monitor wherein the ends of said first strap are adapted to be coupled to a work surface and the length of said first strap is adjustable, and a second monitor support strap adapted to circumferentially engage a proximal end of said monitor; and
   (2) a pivot hinge adapted to pivotally couple said monitor to said work surface wherein said pivot hinge comprises a first member and a second member and said first member is coupled to said second strap adapted to circumferentially engage said proximal end of said monitor.

3. A monitor suspension device for suspending a monitor beneath a work surface for viewing said monitor, said device comprising:
   plural straps engageable with a monitor for supporting said monitor, at least one of said straps being adapted to be connected to said work surface and engaged with a back surface of the monitor at an opposite end of said monitor from a screen of said monitor and the length of said at least one strap being adjustable; and
   a coupling for connecting said work surface and said straps for allowing said monitor to pivot with respect to said work surface to change the angle of the screen of said monitor with respect to said work surface, in response to adjusting the length of said at least one strap.

4. The suspension device set forth in claim 3 wherein:
   said coupling includes at least one hook member operably connected to said straps and engageable with an elongated pivot rod connected to spaced apart support brackets adapted to be supported by said work surface.

5. The suspension device set forth in claim 3 wherein:
   said at least one strap comprises a lateral strap assembly adapted to be connected at its opposite ends to strap support assemblies for connecting said suspension device to the work surface and said lateral strap assembly is provided with at least one adjustment means for adjusting the effective length of said lateral strap assembly to adjust the angle of said screen with respect to said work surface.

6. The suspension device set forth in claim 3 wherein:
   said plural straps include at least one gripping strap assembly adapted to extend circumferentially around said monitor and be in gripping engagement therewith.

7. The suspension device set further in claim 6 wherein said plural straps include:
   at least one vertical strap assembly connected at one end of said gripping strap assembly and adapted to extend around the back surface of said monitor and connected at its opposite ends to said gripping strap assembly.

8. The suspension device set forth in claim 6 wherein said plural straps include:
   at least one circumferential support strap spaced from said gripping strap assembly and adapted to extend around said monitor between a proximal end and the back surface of said monitor.

9. A monitor suspension device for suspending a monitor beneath a work surface for viewing said monitor, said device comprising:

a strap assembly including a circumferential gripping strap and a tightening clamp assembly secured to said gripping strap for adjusting a gripping force applied to said monitor; a lateral strap adapted to engage a back surface of said monitor at an opposite end of said monitor from a screen of said monitor with the ends of said lateral strap being adapted to be coupled to the work surface and the length of the lateral strap being adjustable for changing an angle of the screen relative to the work surface; and a coupling engaged with said strap assembly for allowing said strap assembly and said monitor to pivot with respect to said work surface to change the angle of the screen of said monitor with respect to said work surface.

10. The suspension device set forth in claim 9 wherein: said strap assembly includes a plurality of substantially rigid members engageable with opposed surfaces of said monitor, and said gripping strap is engaged with said rigid members.

11. The suspension device set forth in claim 10 including: non slip backing means connected to said rigid members, respectively, and engageable with said opposed surfaces of said monitor respectively.

12. The suspension device set forth in claim 10 wherein: said clamp assembly is connected to one of said rigid members of said strap assembly.

13. The suspension device set forth in claim 10 wherein: said coupling is connected to one of said rigid members of said strap assembly.

14. The suspension device set forth in claim 10 wherein: said rigid members comprise elongated channel-shaped members adapted for receiving said gripping strap in a channel thereof, respectively.

15. The suspension device set forth in claim 9 wherein said strap assembly includes:

at least one vertical strap assembly operably connected at one end to said gripping strap, and adapted to extend around the back surface of said monitor and operably connected at its opposite end to said gripping strap.

16. The suspension device set forth in claim 9 wherein: the lateral strap is connected at its opposite ends to strap support assemblies for connecting said suspension device to the work surface and said lateral strap is provided with at least one adjustment means for adjusting the effective length of said lateral strap to adjust the angle of said screen with respect to said work surface.

17. The suspension device set forth in claim 9 wherein said strap assembly includes:

at least one circumferential support strap spaced from said gripping strap and adapted to extend around said monitor between a proximal end and the back surface of said monitor.

18. A method for suspending a monitor with respect to a work surface comprising the steps of:

providing monitor cradling means for cradling a monitor, said monitor cradling means comprising a plurality of straps arranged to securely hold said monitor, at least one of said straps being adapted to engage a back surface of said monitor at an opposite end of said monitor from a screen of said monitor and the length of said at least one strap being adjustable, and a coupling for pivotally coupling said monitor cradling means to said work surface to provide for pivoting said monitor with respect to said work surface to change the angle of the screen of said monitor with respect to said work surface;

connecting said coupling to said work surface; and adjusting the length of said at least one strap to cause said monitor and said cradling means to pivot with respect to said work surface to a desired angle of a screen of said monitor with respect to said work surface.

19. The method set forth in claim 18 including the steps of:

providing said monitor cradling means with said plurality of straps including a gripping strap assembly adapted to securely grip said monitor on opposed surfaces thereof;

placing said gripping strap assembly in a predetermined position for engagement with said monitor; and applying a tightening force to said gripping strap assembly to securely grip said monitor when said monitor is suspended with respect to said work surface.

* * * * *